(12) United States Patent
Westerman et al.

(10) Patent No.: US 6,377,339 B1
(45) Date of Patent: Apr. 23, 2002

(54) DOCUMENT IMAGING SYSTEM INCORPORATING A SELECTIVELY OPAQUE/TRANSPARENT LIQUID CRYSTAL PLATEN

(75) Inventors: Larry Alan Westerman, Portland, OR (US); Jeffrey Norris Coleman, Wheaton, IL (US); Gary Alan Feather, Camas, WA (US); James M. Florence, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/280,186

(22) Filed: Mar. 29, 1999

(51) Int. Cl.[7] .................... G03B 27/62; G03B 27/52; G03B 27/32; G02F 1/1335; G02F 1/1333
(52) U.S. Cl. ...................... 355/75; 355/61; 355/74; 355/77; 355/118; 355/129; 349/16; 349/62; 349/110; 349/169; 349/176
(58) Field of Search .................. 355/61, 74, 75, 355/77, 118, 129; 349/16, 62, 110, 169, 176

(56) References Cited

U.S. PATENT DOCUMENTS

| | | | | |
|---|---|---|---|---|
| 4,472,050 A | * | 9/1984 | Stockburger et al. | 355/40 |
| 4,511,246 A | | 4/1985 | Nishiyama | 355/75 |
| 4,541,713 A | | 9/1985 | Makawa | 355/75 |
| 4,577,960 A | | 3/1986 | Zambell | 355/75 |
| 4,713,550 A | | 12/1987 | Anzai et al. | 250/560 |
| 4,752,806 A | * | 6/1988 | Haas et al. | 355/3 |
| 4,752,808 A | * | 6/1988 | Lemelson | 355/14 |
| 4,823,165 A | | 4/1989 | Narukawa et al. | 355/75 |
| 4,939,377 A | | 7/1990 | Okuda et al. | 250/560 |
| 5,016,049 A | | 5/1991 | Onishi et al. | 355/203 |
| 5,072,259 A | | 12/1991 | Ikeda | 355/218 |
| 5,122,833 A | | 6/1992 | Sato | 355/203 |
| 5,241,346 A | | 8/1993 | Ide et al. | 355/235 |
| 5,258,812 A | | 11/1993 | Mahoney | 355/214 |
| 5,311,248 A | * | 5/1994 | Iwata | 355/61 |
| 5,333,039 A | | 7/1994 | Sagara | 355/218 |
| 5,497,217 A | | 3/1996 | Yoshida | 355/77 |
| 5,691,795 A | * | 11/1997 | Doane et al. | 349/169 |
| 5,764,316 A | | 6/1998 | Takizawa et al. | 349/1 |

* cited by examiner

*Primary Examiner*—Russell Adams
*Assistant Examiner*—Khaled Brown
(74) *Attorney, Agent, or Firm*—Marger Johnson & McCollum, P.C.

(57) ABSTRACT

A method and apparatus for document imaging is disclosed. The apparatus uses a flatbed scanner with a selectively opaque/transparent liquid crystal platen. The platen is divided into controllable segments defined by an electrode pattern formed within the platen itself. These segments can each be selectively made transmissive or opaque by applying appropriate voltages to the segment electrodes.

An advantage of the invention is that it can operate without a platen cover, since the area of the platen not covered by the original can be made opaque. The opaque part of the platen directs imaging light back into the system, shielding a user's eyes and helping to create a white background if the platen is imaged.

13 Claims, 10 Drawing Sheets

DOCUMENT IMAGING SYSTEM INCORPORATING A SELECTIVELY OPAQUE/TRANSPARENT LIQUID CRYSTAL PLATEN

FIELD OF THE INVENTION

This invention pertains generally to document imaging systems, and more particularly to electro-optical document imaging systems incorporating transparent document support platens.

BACKGROUND OF THE INVENTION

Document imaging systems, that is, electro-optical systems that sense and process the visual appearance of documents and/or other objects presented to them, have progressed far beyond the original black and white analog copier. This category of devices now also includes digital facsimile devices, black and white and color scanners that capture documents to electronic form, digital copiers, color copiers, and devices that can function as two or more of these devices—some also functioning as printers.

Most document imaging systems generally detect the content of an image by scanning, i.e., providing for relative movement between the document and one or more detectors. In some imaging systems, including historically, most facsimile machines, the document is fed past the detectors a scan line at a time, or at a known rate. In other imaging systems, the document remains stationary on a flat bed, or transparent support platen, while the detector is manipulated below the platen.

Flatbed systems have several advantages. They can accept a wide variety of shapes, sizes, textures, and thicknesses of documents, including books and fragile or valuable documents that could be damaged by a feeder. Also, document feeders rely on friction drive, but detector movement systems can employ non-slipping translational drives that allow more precise positioning and greater speed.

Flatbed systems also have disadvantages related to their configuration. The support platen must be large enough to hold the largest document processable by the system. When smaller documents are placed on the transparent platen (most systems rarely image the largest possible document), large expanses of the transparent platen remain uncovered. This necessitates the usage of a platen cover, both to shield the user from bright imaging lighting and to avoid the creation of dark areas in the image when the original fails to cover the entire imaging area. The platen and platen cover are largely responsible for the relatively sizeable footprint of some flatbed systems.

The platen cover itself is bothersome. It must be hinged to swing open and closed, such that the hinges interfere when a user tries to offset an original towards the hinges. It must be opened and closed to insert each original. The act of closing it must be performed slowly to avoid displacing an original, and once it is closed, the original is no longer visible. The platen cover does not conform well to books and other thick originals. If the platen cover is not kept clean, it creates smudged areas in an image when it is visible in the imaging area.

Some of the problems of a platen cover can be avoided when a document feeder that automatically positions documents on the platen is incorporated into the cover. But the feeder increases the bulk of the platen cover that must be opened and closed, and the feeder belt visible through the platen makes it even more difficult to present a white background to the imager.

SUMMARY OF THE INVENTION

A flatbed document imaging system is disclosed that does not depend on a platen cover to reflect imaging light back into the system. The system uses a platen having an array of polymer/liquid crystal (PLC) segments. Each segment can be set to either a transparent mode or an opaque mode. When a segment is in the transparent mode, the imaging system can image through that segment of the platen. When a segment is in the opaque mode, imaging light impinging on that segment is diffused and largely reflected back into the system. Likewise, outside light is diffused and largely prevented from entering the system through an opaque segment. The system further comprises a segment controller and an imaging area calculator. The imaging area calculator instructs the segment controller as to the size and location of a desired transparent imaging area, and the segment controller sets the segments in the array accordingly.

In a second aspect of the invention, a document imaging system platen is disclosed. The platen comprises two transparent insulating plates, with each plate having a transparent electrode pattern formed on it. The plates are stacked with a gap between them, and the gap is filled with a polymer/liquid crystal filler. Regions of the polymer/liquid crystal filler lying between overlapping regions of a transparent electrode from each of the two plates form PLC segments.

In a third aspect of the invention, a method of operating a document imaging system is disclosed. The method comprises activating a subset of an array of PLC segments on a platen, thereby forming a transparent region and an opaque region on the platen. The transparent region can be selected to match the imaging region corresponding to a currently selected image size and magnification for the imaging system. The transparent region can alternately be selected to match the size and positioning of an original document placed on the platen. A user can also be provided controls for manually adjusting the transparent portion of the platen. The method may further comprise directing imaging light at the platen without covering the platen.

BRIEF DESCRIPTION OF THE DRAWING

The invention may be best understood by reading the disclosure with reference to the drawing, wherein:

FIG. 3b contains a timing diagram for one operational mode of the platen of FIG. 3a;

DETAILED DESCRIPTION OF THE PREFERRED EMBODIMENTS

Figure 1A:
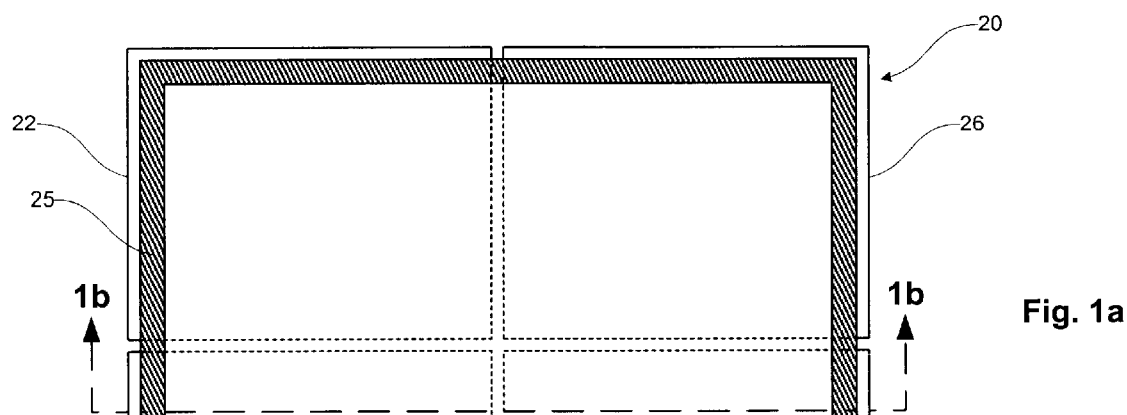
FIGS. 1a and 1b show two views illustrating platen construction according to one embodiment of the invention.

The preferred embodiments are disclosed below as applied to a digital black-and-white copier. The copier is selected by way of illustration and not by way of limitation. Indeed, the disclosed embodiments apply equally to other electro-optical flatbed document imaging systems that utilize visible light, including color copiers, analog copiers, scanners, digitizers, facsimile machines, and the like. And although a "document" generally refers to flat-surfaced media visible with the unaided eye, such as printed paper sheets, books, and photographs, it is recognized herein that a wide variety of approriately-sized objects may be "documented" with a flatbed imaging system.

As used herein, the word "transparent" refers to an ability to transmit light without diffusing the light to the point that imaging is impossible—thus a transparent platen may absorb or scatter some light. Also, as used herein, the word "opaque" refers to an ability to diffuse light to the point that imaging is impossible—an opaque platen may absorb or transmit some light, but it diffuses and backscatters a significant portion of the lighting directed at it.

Platen Materials

Flatbed imaging systems use a transparent support platen, usually constructed of glass for durability. This platen serves several functions. It supports the object being imaged at an appropriate focal distance for the scanning optical system. It allows light to be reflected off of an object into an electro-optical imaging system. And it protects the imaging system from the outside world.

The present invention utilizes a support platen that incorporates a polymer/liquid crystal filler. A polymer/liquid crystal filler contains liquid crystal material filling the voids in a solid (although possibly flexible) polymer matrix. Although several such fillers are applicable to the invention, they all share several common optical properties. First, each has a mode that is sufficiently transparent to allow imaging. Second, each has an opaque mode that scatters light. Preferably, this mode results in a relatively high degree of backscatter and a relatively low degree of forward scattering. The present invention activates the filler's transparent mode in one region of a support platen and its opaque mode in a second region of the support platen, to form a support platen that is part transparent, part opaque.

One filler applicable to the present invention is polymer-dispersed liquid crystals (PDLCs). PDLCs contain liquid crystal droplets (with sizes preferably on the order of one to a few microns) dispersed in a solid polymer matrix. The refractive index of the droplets is anisotropic, i.e., the index parallel to the director is significantly different from the index perpendicular to the director. Preferably, the index of refraction for the polymer matrix is closely matched to the index of refraction for the liquid crystal droplets measured parallel to their directors. Normally, the directors of the droplets take on random orientations, such that polymer/liquid crystal interfaces with a variety of indices of refraction are presented to an incoming light wave. Thus a PDLC film scatters light, making the film appear opaque. When a PDLC film is placed under an electric field, however, the directors tend to align with the field. The index of refraction for the aligned droplets matches the index for the polymer matrix, such that light propagating parallel to the field may then pass through the field with little scattering, making the film appear transparent.

PDLC material useful in the present invention can be produced by well-known methods, including microencapsulation, polymerization-induced phase separation, and thermally-induced phase separation.

A second filler applicable to the present invention is polymer-stabilized liquid crystals (PSLCs), and specifically reflective cholesteric PSLCs. As compared to PDLCs, which typically include at least 20 weight-percent polymer, PSLCs generally include about 10 weight-percent or less polymer. The amount of polymer is generally insufficient to cause phase separation, but is enough to support the liquid crystal material in a desired zero-field orientation.

Cholesteric PSLCs operating in either a normal mode or a reverse mode can be applied to the invention. Normal-mode cholesteric PSLCs are photopolymerized in a strong electric field that aligns the cells in the homeotropic (and transparent) texture. When the field is relaxed, the cell settles into the focal conic (opaque) texture. Thus with no applied field, the focal conic texture predominates and the cell is opaque. When a substantial electric field is applied, the cell reverts to the homeotropic texture and becomes transparent. Reverse-mode cholesteric PSLCs are photopolymerized between two plates with a planar texture. The resulting PSLC filler also has a planar texture, with a helical pitch that transmits visible light when no voltage is applied. When an electric field is applied, the cholesteric material switches to an opaque focal conic texture.

Platen Physical Configurations

With reference to FIGS. 1a, 1b, 2a, 2b, and 3a, several platen physical configurations applicable to the present invention will now be described. FIG. 1a shows a plan view of a platen 20 having four transparent segment electrodes 22, 24, 26, and 28. Each electrode is formed of a suitable transparent material such as indium tin oxide (ITO). Each electrode is shown protruding slightly at its ends from platen 20 in order to more clearly illustrate the electrode pattern (in practice, the electrodes are usually formed on the transparent support).

Figure 1B:
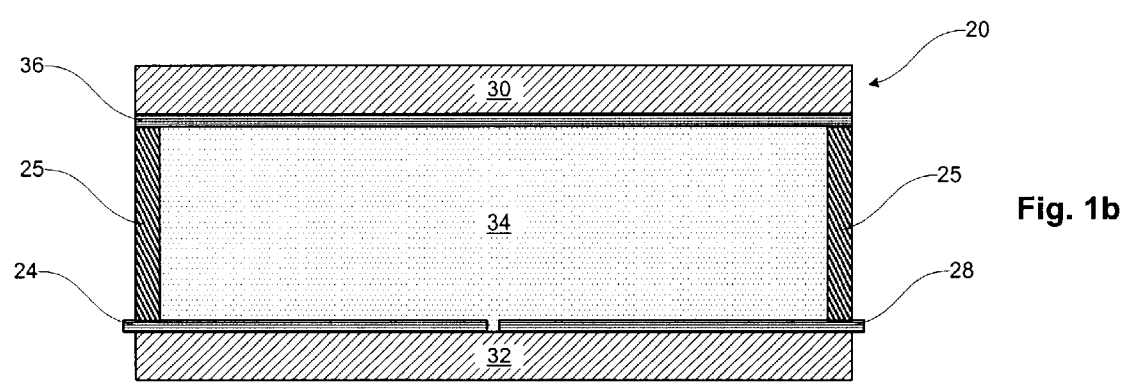

FIG. 1b shows a platen cross-section taken crossing electrodes 24 and 28. Two transparent supports 30 and 32 are stacked approximately parallel and arranged spaced apart (e.g., at a 25 micron spacing) by spacer gasket 25. A common transparent electrode 36 is formed (e.g., of ITO) on one surface of transparent support 30. Segment electrodes 24 and 28 are formed on the facing surface of transparent support 32. Supports 30 and 32 are preferably formed of glass, but may also be formed of polycarbonate, other transparent plastics, or multilayer compositions. Supports 30 and 32 will usually also be proportionally much thicker than shown in FIG. 1b, and may be coated, e.g., with scratch-resistant and/or anti-reflective coatings. PLC filler layer 34 fills the space between supports 30 and 32 that is not occupied by spacer gasket 25 and the electrodes.

The overlapping patterns formed by the segment electrodes and the common electrode define controllable segments of the platen. For instance, when an appropriate voltage difference is induced between electrodes 24 and 36, an electric field is set up in the PLC filler disposed directly between these electrodes. The PLC filler in this region responds to the electric field by switching light transmission states.

The application of appropriate voltages, measured with respect to common electrode 36, to the segment electrodes allows various segments of platen 20 to be selectively opaqued. For instance, the left half of platen 20 can be set transmissive, while the right half remains opaque, by applying a transmissive state voltage to segment electrodes 22 and 24 and an opaque state voltage to segments 26 and 28 (note that the particular voltage levels needed depends on the type of PLC employed).

The structure of platen 20 can be used with a variety of segment electrode patterns useful in the present invention.

The structure is limited, however, to patterns where each segment extends to an edge of the platen. Were isolated segments to be formed in the interior area of platen 20, electrical contact to the segments would require leads extending to an edge of platen 20. Making these leads invisible is difficult in practice.

Figure 2A:
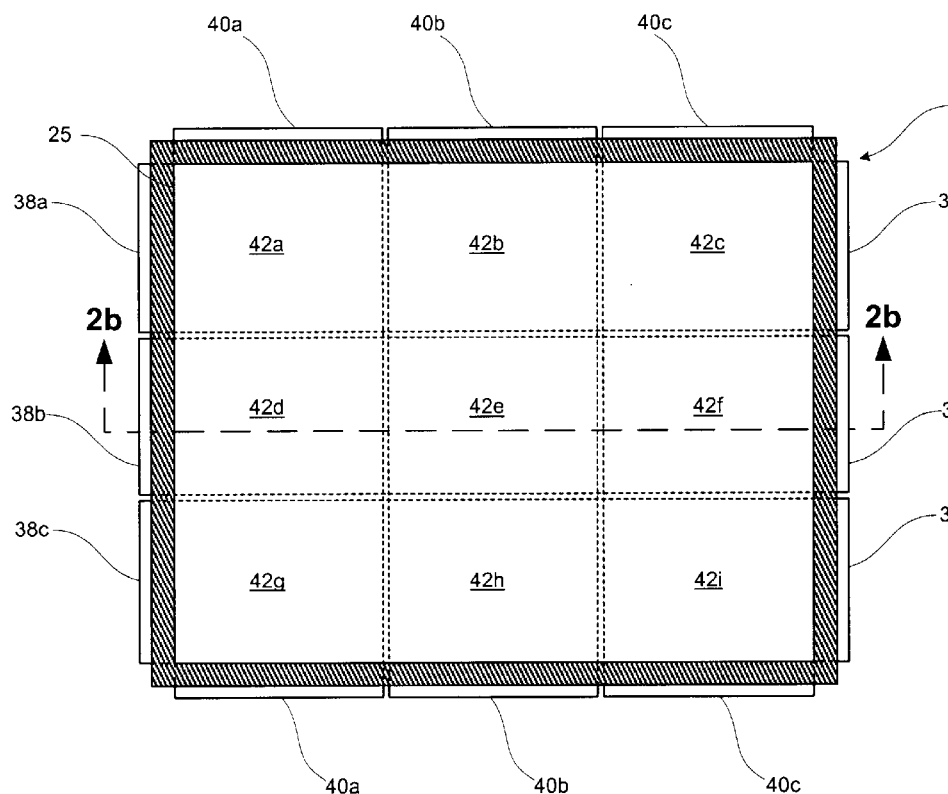
FIGS. 2a and 2b show two views illustrating platen construction according to a second embodiment of the invention.
Figure 2B:
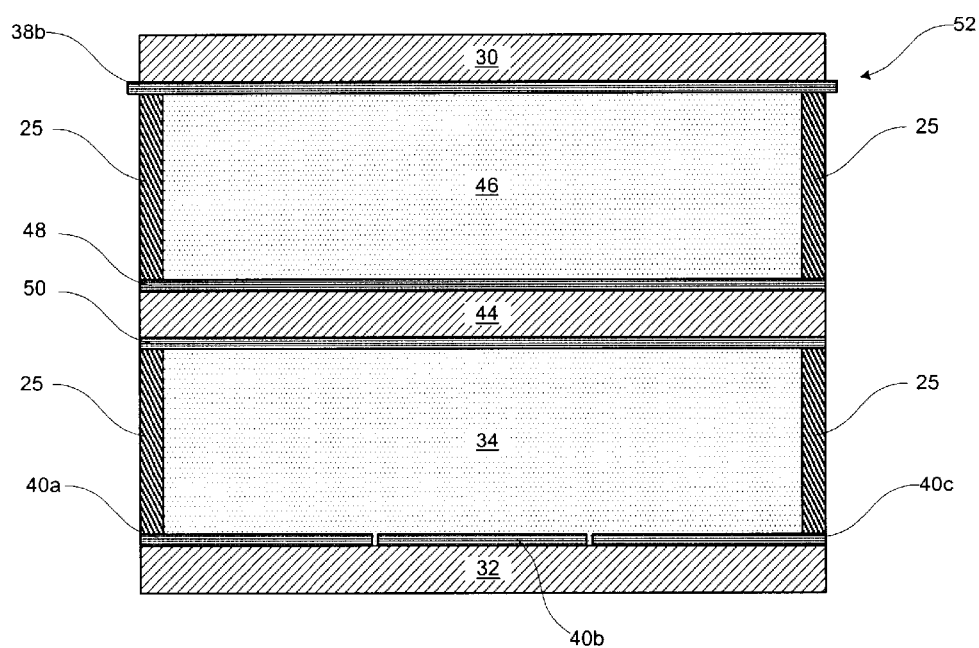

Several alternate structures allow for addressable segments within the interior area of a platen. For example, FIGS. 2a and 2b show a platen 52 incorporating 2 PLC filler layers. Platen 52 uses one set of transverse segment electrodes 38a, 38b, and 38c, and one set of longitudinal segment electrodes 40a, 40b, and 40c. As the cross-section of FIG. 2b shows, the transverse electrodes are formed on one surface of transparent support 30, and the longitudinal electrodes are formed on the facing surface of transparent support 32. An intermediate transparent support 44, placed between supports 30 and 32, fixes the location of common electrodes 48 and 50. Two spacer gaskets 25 maintain separation between the three transparent supports, and the intervening spaces between the supports are filled with PLC filler 34 and 46.

Platen 52 essentially operates as two sets of segments, a transverse set and an independent longitudinal set. Because the segments cross, a series of "effective" segments 42a–42i can be controlled. For instance, interior segment 42e can be set as the only transparent segment by opaqueing transverse segments aligned with electrodes 38a and 38c and longitudinal segments aligned with electrodes 40a and 40c. A variety of patterns are possible.

Figure 3A:
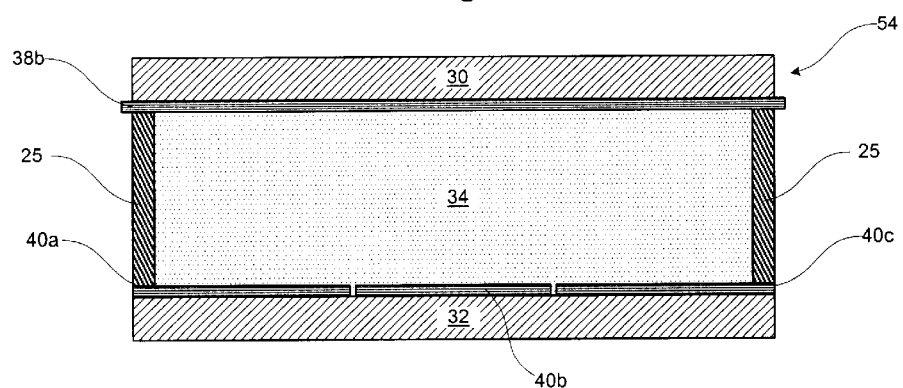
FIG. 3a shows a view illustrating platen construction according to a third embodiment of the invention.

Platen 52 is not completely flexible in segment control, as the transmissive segments generally must be arranged in a contiguous rectangle. Although rectangular arrangements are generally acceptable for most imaging, FIG. 3a illustrates a cross-section of a platen 54 wherein each of segments 42a–42i of FIG. 2a are independently addressable. The physical configuration of platen 54 is similar to that of platen 20, except the common electrode 36 of FIG. 1b has been replaced with the transverse electrodes 38a–38c of FIG. 2a. Thus the segments resulting from the configuration of FIG. 3a are formed by placing PLC filler in the region between a transverse electrode and a longitudinal electrode.

The light transmission state of segments 42a–42i can be set individually by appropriately synchronizing the voltage state of transverse electrodes 38a–38c with the voltage state of longitudinal electrodes 40a-40c. For instance, if the PLC is opaque at 0 V applied between the electrodes, but switches to a transmission state at a voltage 2V, segment 42e of FIG. 2a can be switched by applying V Volts to electrode 38b and −V Volts to electrode 40b. As long as electrodes 38a, 38c, 40a, and 40c remain at an intermediate voltage (i.e. 0 V), segments 42a–42d and 42f–42i remain opaque.

Figure 3B:
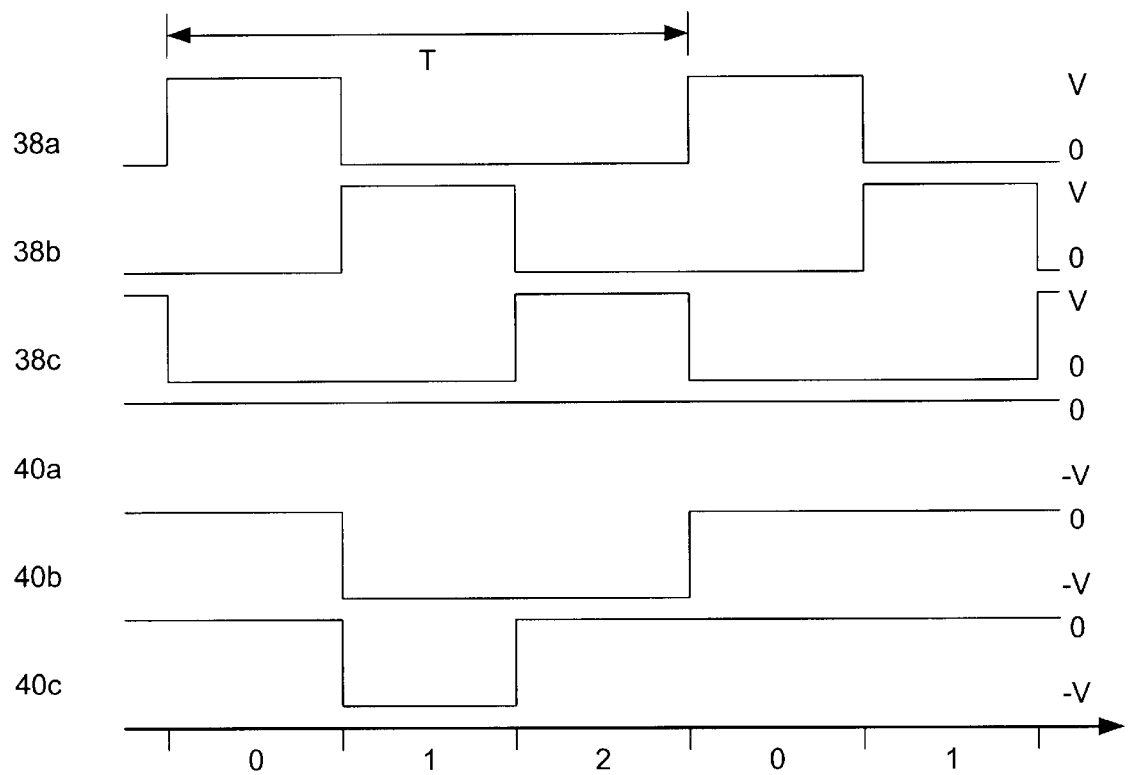

Complex transmissive patterns can be achieved by multiplexing the electrode signals applied to platen 54. FIG. 3b illustrates a segment timing diagram that results in a transmissive region consisting of segments 42e, 42f, and 42h only. A time period T is divided into three equal time segments 0, 1, and 2. During time segment 0, a voltage V is applied to transverse electrode 38a. During time segment 1, a voltage V is applied to transverse electrode 38b. And during time segment 2, a voltage V is applied to transverse electrode 38c. This cycle then repeats for the next time period.

During the time segment corresponding to a "row" of platen segments, longitudinal electrodes are energized for the segments on that row that should be transmissive. Thus longitudinal segment 40b is set to a voltage −V during time segments 1 and 2 to set segments 42e and 42f to a transmissive state. And longitudinal segment 40c is set to a voltage −V during time segment 1 to set segment 42h to a transmissive state.

The time period T should be adjusted to be shorter than the turn-off time for the PLC material, in order to avoid flicker. Note also that during time segment 0, no platen segments are set and thus the time segment is unnecessary. The minimum number of time segments required to create a desired platen pattern is generally equal to the number of different row patterns currently in use that have at least one platen segment set. Thus for the example above, only two time segments are required. For a rectangular platen pattern, only one time segment is required and no sequencing is necessary.

Platen Segment Layout

Figure 4:
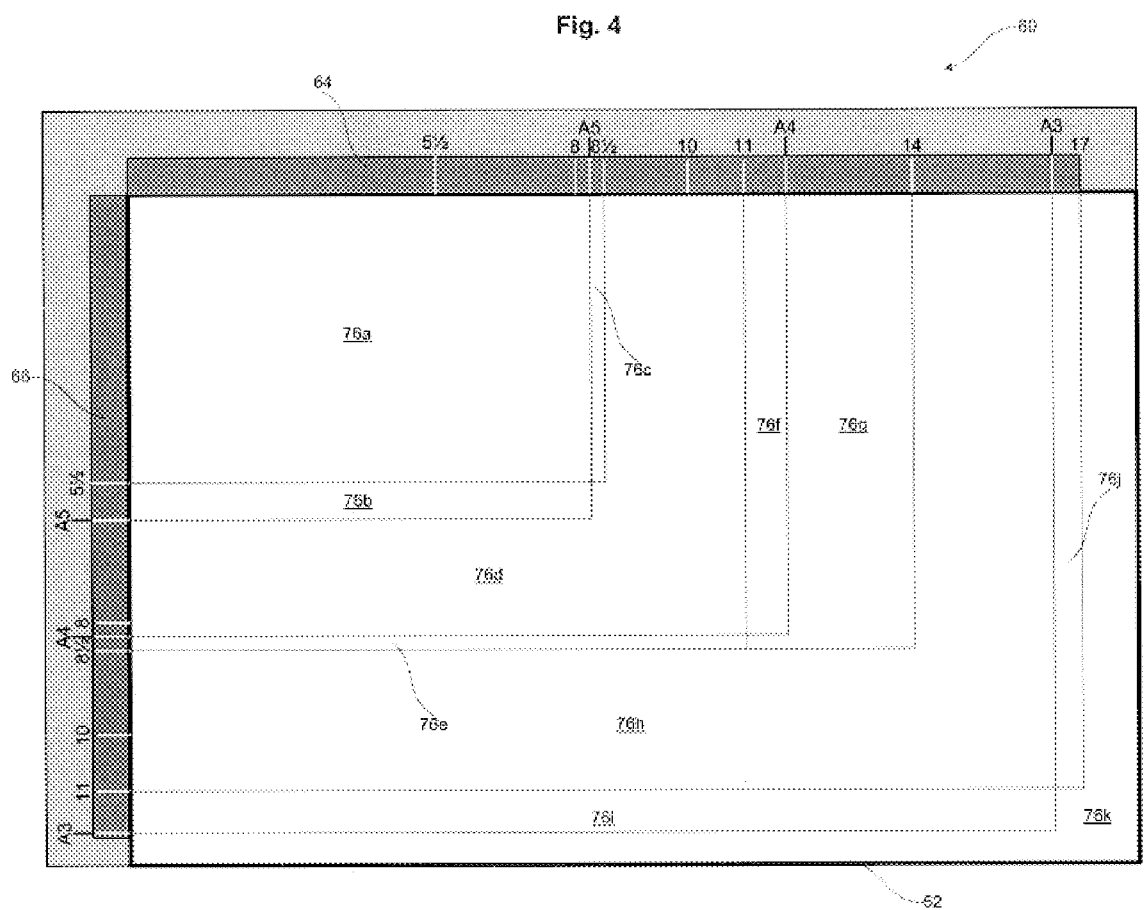
FIGS. 4, 5–7, and 8 illustrate various platen electrode layouts according to the invention.

The layout of platen segments generally will depend on the use and capabilities of the digital imaging system employing the invention. FIG. 4 shows one platen configuration 60 for a copier. A platen 62 is fitted with scales 64 and 66 containing gradations at several common original sizes. Segment boundaries on platen 62 are aligned with these gradations to address the most common original document sizes. For instance, a transparent imaging area corresponding to an 8½×11 original can be formed by activating segments 76a, 76b, 76c, 76d, and 76e. An imaging area corresponding to an A4 original can be activated by activating segments 76a, 76b, 76c, 76d, and 76f. This layout can be used with the platen configuration of FIGS. 1a and 1b, as all segments reach the edge of the platen. More segments can be added to allow more original sizes, as long as the original sizes do not intersect so as to create a segment isolated from the edges of platen 62.

Figure 5:
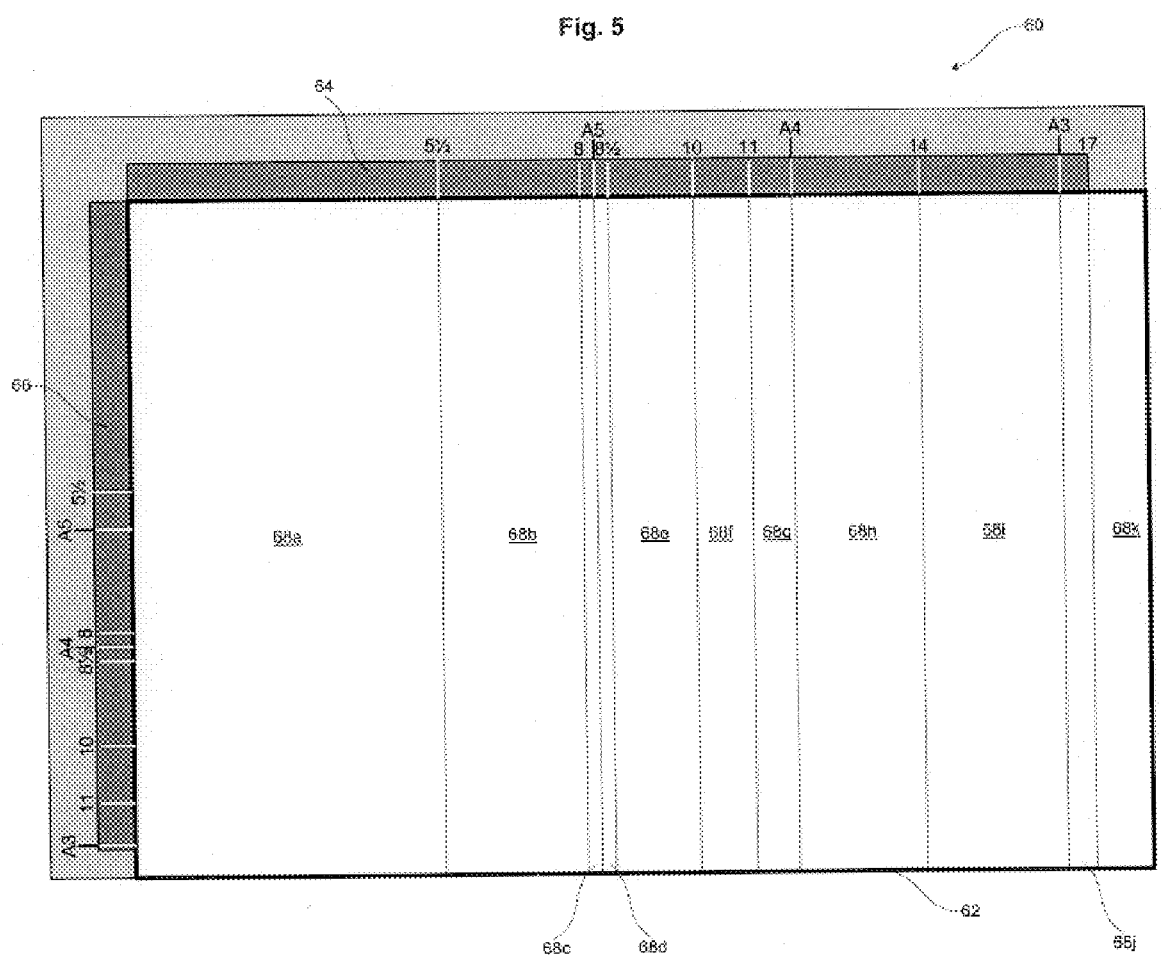
Figure 6:
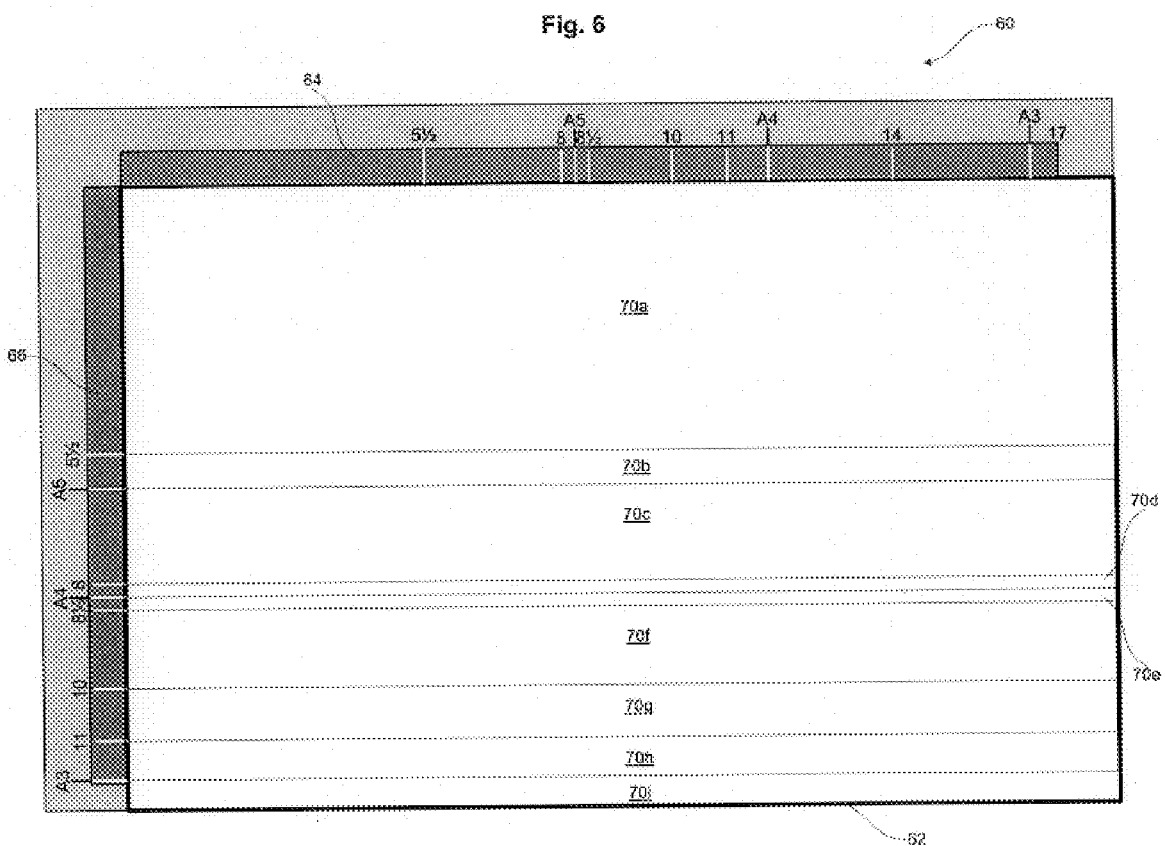
Figure 7:
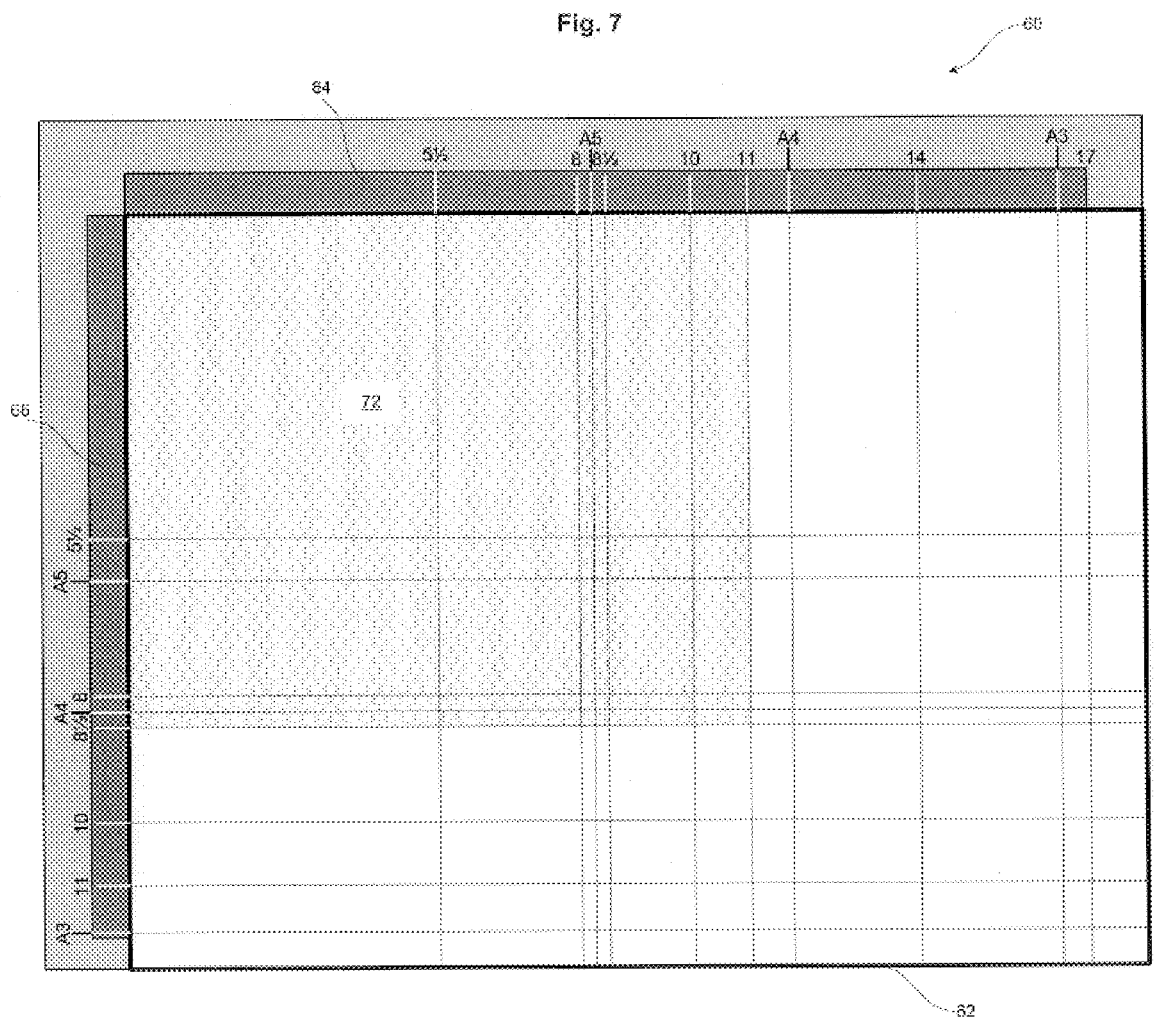

The layout of a second platen configuration 60 is illustrated in FIGS. 5–7. FIG. 5 shows the layout of longitudinal segment electrodes 68a–68k corresponding to the eleven original sizes on horizontal scale 64. FIG. 6 shows the layout of transverse segment electrodes 70a–70i corresponding to the nine original sizes on vertical scale 66. FIG. 7 shows a platen 62 that uses the segment electrodes of FIGS. 5 and 6 to create addressable platen regions. By appropriate activation of electrodes, platen 62 can activate a transparent area corresponding to any pairing of the horizontal and vertical gradations. For example, the shaded area 72 of FIG. 7 represents an 8½×11 transparent imaging area, and is created by activating longitudinal electrodes 68a–68f of FIG. 5 and transverse electrodes 70a–70e of FIG. 6. The platen physical configuration of either FIG. 2b or FIG. 3a is appropriate to create the segment pattern shown in FIG. 7.

Figure 8:
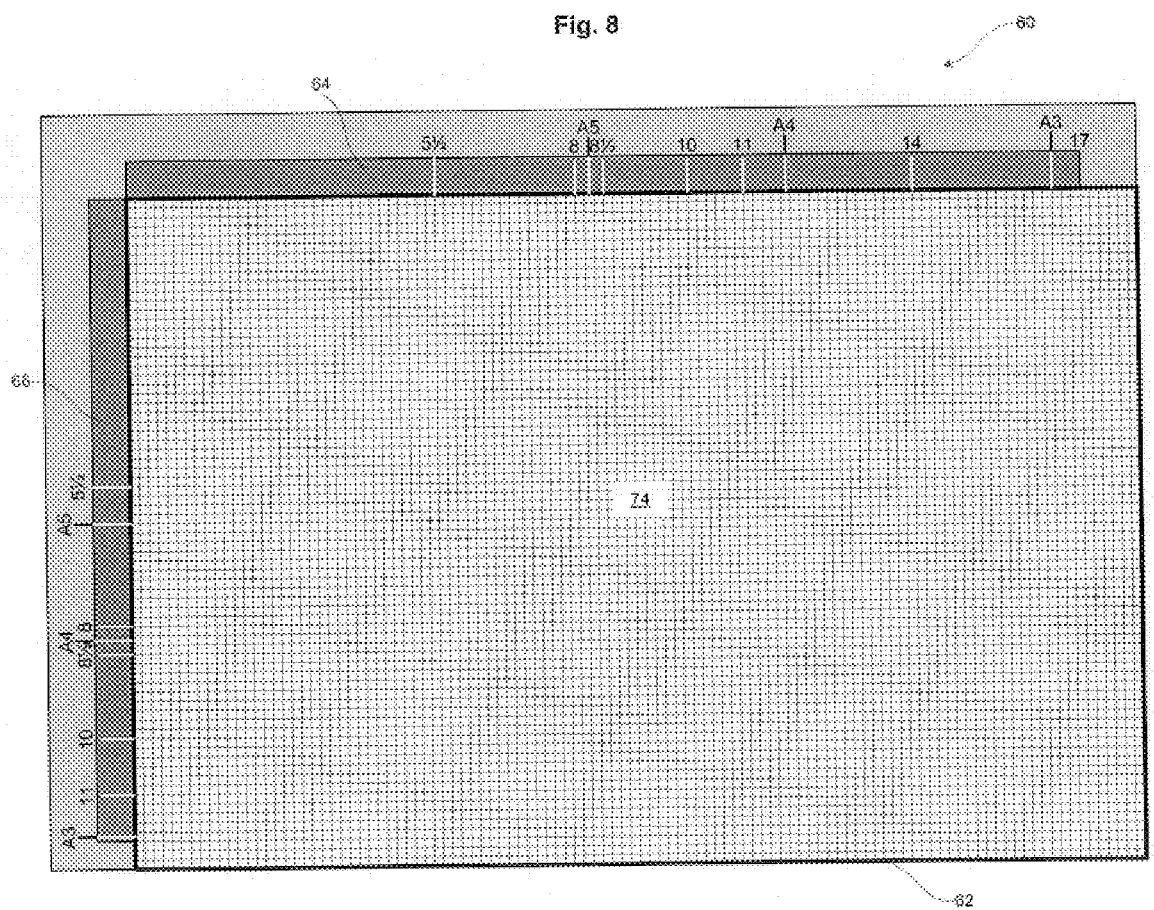

In some systems, finer adjustment of the imaging area may be desirable. This can be accomplished by adding more addressable segments. For instance, segment grid array 74 of FIG. 8 is formed of transverse and longitudinal electrodes arranged in a uniform spacing of four electrodes per inch. For a 12×18-inch platen, a total of 48 transverse electrodes and 72 longitudinal electrodes are required to form this grid array. This array may be used, e.g., to indicate the imaging area corresponding to the currently selected magnification and paper size. If the physical configuration of FIG. 3a is combined with segment multiplexing, complex transparent patterns can also be created with grid array 74.

Imager Configuration

Figure 9:
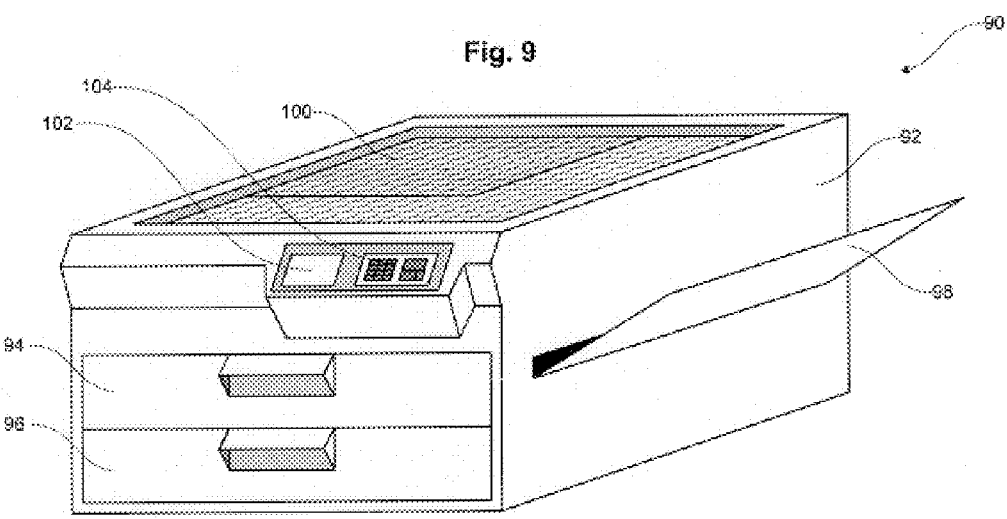
FIG. 9 shows the physical configuration of a digital copier according to an embodiment of the invention.

Physically, most of the components of a digital copier according to the present invention largely resemble those of prior art copiers, with the exception of the new platen and its controls. For instance, FIG. 9 shows a copier 90 according to the present invention. A case 92 holds one or more paper supply trays 94, 96, and has an output tray 98. Controllable platen 100 occupies a large portion of the top surface of case 92. A control/display panel 102/control panel 104 allows a user to control and receive messages from copier 90.

One piece of a prior art digital copier is missing from digital copier 90. Copier 90 has no platen cover, as none is needed to shield a user's eyes or to aid in imaging. Optionally, a document feeder or a simple platen cover (i.e., to shield the platen from dust when not in use) may be used in conjunction with the invention. When one of these covering devices is included but not in use, it can be detached or swung aside so as not to impede manual copier operation, unlike prior art devices that must hinge close to the platen and remain, at best, partially open.

Figure 10:
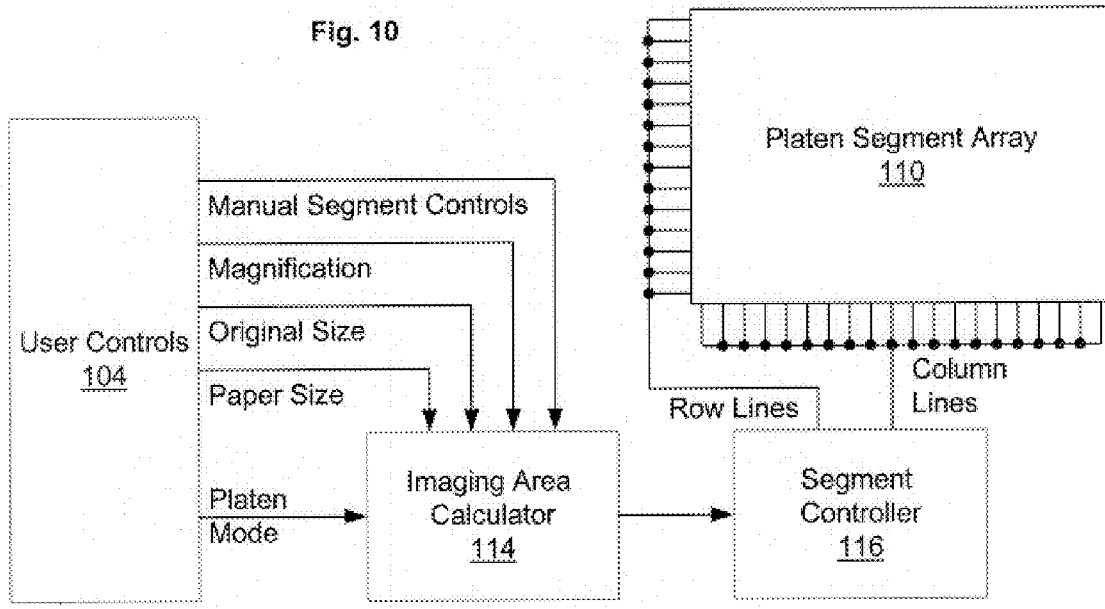
FIG. 10 contains a block diagram of platen control electronics for a digital copier according to an embodiment of the invention.

Electronically, copier 90 must incorporate drive electronics for platen 100. FIG. 10 illustrates one possible interface between a user and a platen segment array 110 incorporated in a platen 100 (the platen segment array of FIGS. 9 and 10 is arranged as transverse electrodes and longitudinal electrodes, although other configurations are possible).

Figure 11:
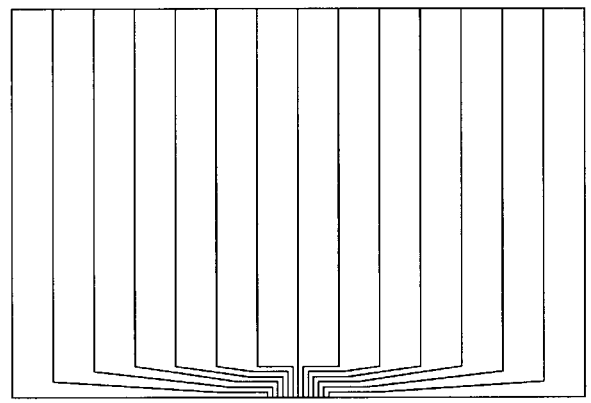
FIG. 11 shows a platen electrode configuration with connection wiring patterned in a non-imaging area of the platen.

Platen segment array 110 must be electrically connected to the drive electronics. Row lines are shown electrically connected to the transverse electrodes of the array at the left platen boundary. Column lines are shown likewise connected to the longitudinal electrodes of the array at the bottom platen boundary. These lines are fed to a segment controller 116 that is capable of selectively energizing various segments. Note that the transparent electrodes may be patterned to converge to one or more relatively small areas at the periphery of the platen by patterning peripheral leads into the electrode pattern as shown in FIG. 11. Segment controller 116 connects to the row lines and column lines. This connection may comprise a physical line-by-line connection, or may use multiplexed segment drivers.

Segment controller 116 activates the appropriate electrodes for a currently defined imaging area as supplied by the imaging area calculator. In some systems, segment controller 116 may comprise a read-only table memory that is addressed by one of several predefined imaging area values. In more complex systems, the boundaries of a physical platen area may be supplied to controller 116, which then uses a processing algorithm to compute the subset of electrodes that must be activated to create the requested pattern.

Imaging area calculator 114 selects a transparent imaging area based on user input. For instance, a user can select, with user controls 104, one of several platen transparency modes. Platen transparency modes can include original size mode, imaging size mode, and manual mode. In an original size mode, imaging area calculator 114 uses the currently selected original size, and requests a transparent area of the platen corresponding to this size. In an imaging size mode, imaging area calculator 114 uses the currently selected paper size and magnification, and requests a transparent area of the platen corresponding to the size that will be imaged onto the currently selected paper at the current magnification. In a manual mode, the user activates manual resizing segment controls, indicating to the imaging area calculator that the size of the transparent area should be changed, e.g., in one electrode increments. Any of these modes can optionally activate the copier's imaging light or a smaller internal light, allowing the imaging area to be visible through a large original as a positioning aid.

Figure 12:
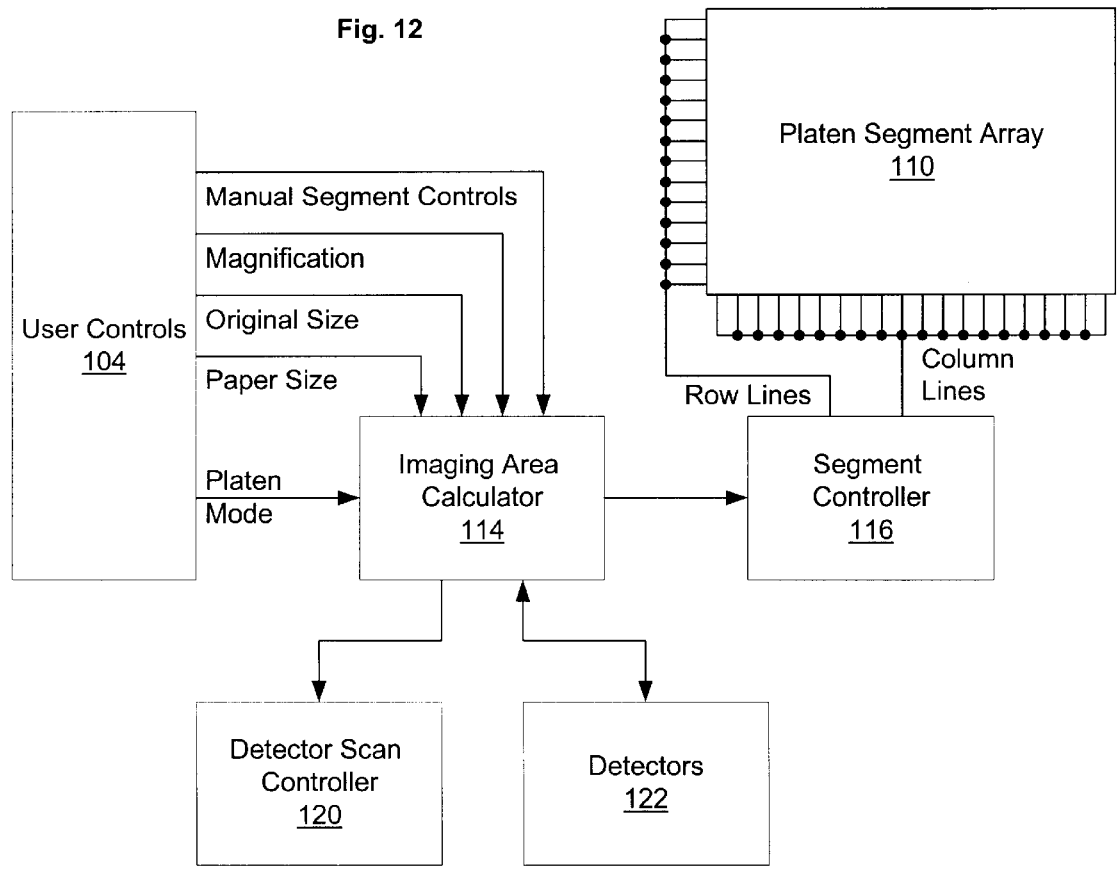
FIG. 12 contains a block diagram of platen control electronics for a digital copier according to a document-detecting embodiment of the invention.

In a further embodiment shown in FIG. 12, an original detection mode can also be implemented. In the original detection mode, imaging area calculator 114 works with detector scan controller 120 and detectors 122 to determine the placement of an original on the platen. For instance, when this mode is requested, detector scan controller and detectors 122 can be instructed to scan the platen area as they would scan to image an original, except without activating a scanning light. At the same time, the entire platen can be made transparent. As the detectors are scanned across the platen, they respond to ambient light received through the platen, everywhere that an original document is not. This detection pattern is fed back to imaging area calculator 114, which then determines the size and positioning of the original and requests that segment controller 116 opaque the areas of the platen where ambient light was received.

The original detection mode can be used in several ways. It can be used to autoselect a paper tray corresponding to original size. It can be used to relax document positioning constraints. And it can be used to easily create a non-rectangular transparent region (or multiple transparent regions) on the platen, e.g., to fit the boundaries of a non-rectangular original or several small originals.

Original detection mode has several options. The transparent area of the segment array can be synchronized with the current detector location as the detector sweeps across the platen. The mode may also use the copier's internal light instead of ambient light to detect the original in a mode inverse to the mode above. Note also that the original detection mode can use a quick-scan that samples the platen area with a resolution appropriate for the platen segment size.

Armed with this disclosure, one of ordinary skill in the art will recognize that the concepts taught herein can be extended in many obvious and advantageous ways. For example, platen segments underlying a region of an original can be activated during imaging to "erase" that region of the original in the duplicate. A suitably segmented platen array can also be used to display textual information to a user, e.g., by displaying the text using a platen segment pattern of opaque and transparent segments. For instance, a platen with no external scales can display scales or indicate the size of the imaging area textually using the platen segments.

Other minor modifications are encompassed within the invention. The exact configuration of the spacer gasket is unimportant, as long as the appropriate spacing can be maintained between the transparent supports. A segment corresponding to the smallest possible imaging size can be rendered always transparent. These and other such modifications are intended to fall within the scope of the claims.

What is claimed is:

1. A flatbed document imaging system comprising:
   a platen having an integral transparent electrode pattern and incorporating a polymer/liquid crystal filler material, the electrode pattern defining an array of polymer/liquid crystal segments that effectively covers the imaging area of the platen, each of the segments settable to either a transparent mode or an opaque mode; and
   a segment controller electrically connected to the electrode pattern, the segment controller capable of energizing selected electrodes in the electrode pattern such that segments in a current transparent region of the imaging area are set in transparent mode and segments outside of the current transparent region are set in opaque mode during a document-imaging scan.

2. The flatbed document imaging system of claim 1, further comprising an imaging area calculator that calculates a desired transparent region of the platen based on user input, and communicates the desired transparent region to the segment controller.

3. The flatbed document imaging system of claim 1, wherein the electrode pattern is arranged as a first set of transverse electrodes effectively covering the imaging area of the platen and a second set of longitudinal electrodes effectively covering the imaging area, the first and second set of electrodes disposed on opposite sides of the polymer/liquid crystal filler material.

4. The flatbed document imaging system of claim 3, wherein the segment controller comprises a multiplexer capable of activating multiple transverse electrodes and multiple longitudinal electrodes simultaneously to produce a desired transparent region on the platen.

5. A method of operating a document imaging system, comprising the steps of:

activating a subset of an array of polymer/liquid crystal segments disposed on a platen so as to effectively cover the imaging area of the platen, thereby dividing the platen into a transparent region and an opaque region; and while the subset of segments is activated, imaging a document through the transparent region of the platen.

6. The method of claim 5, further comprising prior to the activating step, selecting a desired transparent region for the platen, and determining an appropriate subset of the array of polymer/liquid crystal segments to activate.

7. The method of claim 6, wherein the appropriate subset of the array of segments is determining by indexing into a look-up table containing an array activation matrix as a function of the desired transparent region.

8. The method of claim 6, wherein the appropriate subset of the array of segments is determined by calculating, on a processor having knowledge of the array's configuration, a subset of the array best fitting the desired transparent region.

9. The method of claim 6, wherein the step of selecting a desired transparent region for the platen comprises calculating the desired transparent region based on a current mode chosen by a user from a group of user-selectable modes including an original size mode, where the transparent region corresponds to the currently selected original document size, and an imaging size mode, where the transparent region corresponds to the area that will be imaged onto the currently selected output media at the current magnification.

10. The method of claim 9, wherein the group of user-selectable modes further comprises a manual mode, where the user can manually adjust the size of the transparent area.

11. The method of claim 10, wherein the group of user-selectable modes further comprises an original detection mode, operation of the original detection mode comprising the steps of scanning the platen with a light detector while setting the area of the platen imaged by the light detector transparent, discriminating, based on detector output, those areas of the platen covered by a document, and setting the transparent region to fit those areas covered by a document.

12. The method of claim 10, wherein the discriminating step uses ambient lighting passing through the platen, and determines the positioning of the document to coincide with locations where the level of ambient lighting is decreased significantly.

13. The method of claim 5, further comprising the step of backlighting the platen surface prior to the imaging step, thereby providing a document positioning aid.

* * * * *